US012576572B2

(12) United States Patent
Carbonell et al.

(10) Patent No.: US 12,576,572 B2
(45) Date of Patent: Mar. 17, 2026

(54) FILAMENT COMPOSITION

(71) Applicant: Dow Global Technologies LLC, Midland, MI (US)

(72) Inventors: Albert Carbonell, Tarragona (ES); Eduardo Alvarez-Acedo, Tarragona (ES); Maria Isabel Arroyo Villan, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 245 days.

(21) Appl. No.: 17/634,713

(22) PCT Filed: Oct. 1, 2020

(86) PCT No.: PCT/US2020/053682
§ 371 (c)(1),
(2) Date: Feb. 11, 2022

(87) PCT Pub. No.: WO2021/067534
PCT Pub. Date: Apr. 8, 2021

(65) Prior Publication Data

US 2022/0281150 A1 Sep. 8, 2022

(30) Foreign Application Priority Data

Oct. 4, 2019 (EP) .................................... 19382865

(51) Int. Cl.
*D01F 6/46* (2006.01)
*B29C 48/00* (2019.01)
(Continued)

(52) U.S. Cl.
CPC ............ *B29C 48/05* (2019.02); *B29C 48/022* (2019.02); *D01F 6/46* (2013.01); *D06N 7/0065* (2013.01);
(Continued)

(58) Field of Classification Search
CPC ......... B29C 48/05; B29C 48/022; D01F 6/46; D01F 8/06; D06N 7/0065;
(Continued)

(56) References Cited

U.S. PATENT DOCUMENTS 6,274,675 B1 8/2001 DePorter et al.
9,447,269 B2 9/2016 Walther et al.
(Continued)

FOREIGN PATENT DOCUMENTS

CN 109337168 A 2/2019
EP 3040199 A1 7/2016
(Continued)

OTHER PUBLICATIONS

PCT/US2020/0533682, International Search Report and Written Opinion with a mailing date of Dec. 18, 2020.
(Continued)

*Primary Examiner* — Matthew D Matzek
(74) *Attorney, Agent, or Firm* — Boyle Fredrickson S.C.

(57) ABSTRACT

A composition for forming a filament including a blend of: (a) from 1 wt % to 40 wt % of a post-consumer recycled material having a density of from 0.910 g/cm$^3$ to 0.940 g/cm$^3$ and a melt index of from 1.0 g/10 min to 5.0 g/10 min; wherein the post-consumer recycled material consists essentially of (ai) from 30 wt % to 99 wt % of a linear low density polyethylene and (aii) from 1 wt % to 70 wt % of a low density polyethylene; and (b) from 60 wt % to 99 wt % of a virgin linear low density polyethylene; wherein the viscosity in pascal-seconds of the virgin linear low density polyethylene is no less than 0.5 times the viscosity of the post-consumer recycled material and no more than 2.0 times the viscosity of the post-consumer recycled material in the range of from 50 rad/s shear rate to 220 rad/s shear rate; a process for making the above filament composition; a fila-
(Continued)

ment made from the above filament composition; a process for producing the above filament; an artificial turf made from the above filament; and a process for manufacturing an artificial turf.

18 Claims, 1 Drawing Sheet

(51) Int. Cl.
*B29C 48/05* (2019.01)
*D06N 7/00* (2006.01)
*B29K 23/00* (2006.01)

(52) U.S. Cl.
CPC ................ *B29K 2023/0625* (2013.01); *D06N 2201/0254* (2013.01); *D10B 2321/021* (2013.01); *D10B 2505/202* (2013.01); *Y10T 428/23993* (2015.04)

(58) Field of Classification Search
CPC .... D06N 2201/0254; B29K 2023/0625; D10B 2321/021; D10B 2505/202; Y10T 428/23993; C08L 2207/20; C08L 23/0815; C08L 23/04; G03G 5/00
USPC ........................................................... 428/97
See application file for complete search history.

(56) References Cited

U.S. PATENT DOCUMENTS

2010/0292403 A1* 11/2010 Ansems ................ C09J 151/06 525/125
2012/0315816 A1* 12/2012 Fowler .................. B32B 5/022 264/129
2013/0030123 A1 1/2013 Martin et al.
2019/0100857 A1* 4/2019 Sick ......................... D01F 8/12
2019/0153679 A1* 5/2019 Neuhoff .............. D05C 17/026
2019/0185647 A1* 6/2019 Wassenaar ............... D01F 6/04

FOREIGN PATENT DOCUMENTS

EP 3604675 B1 2/2020
WO 1993/000400 A1 1/1993
WO 1994003537 A1 2/1994
WO 2014167493 A1 10/2014
WO 2017/152041 A1 3/2017
WO 2017182466 A1 10/2017
WO 2018/077850 A1 5/2018

OTHER PUBLICATIONS

PCT/US2020/0533682, International Preliminary Report on Patentability with a mailing date of Apr. 5, 2022.
Al-Salem S M et al, "Study of the degredation profile for virgin linear low-density polyethylene (LLDPE) and polyolefin (PO) plastic waste blends", Journal of Material Cycles and Waste Management, May 4, 2019, pp. 1106-1122, vol. 21, No. 5, Springer Japan, Tokyo.

* cited by examiner

FILAMENT COMPOSITION

FIELD

The present invention is related to a composition including a post-consumer recycled (PCR) material; and a monofilament made from the composition wherein the processability of the monofilament is enhanced without compromising its mechanical properties. The monofilament is suitable for use in manufacturing artificial turf and other artificial grass applications. In one embodiment, the source of the PCR material is from packaging waste.

BACKGROUND

Because of an increasing world population and prosperity, the need for plastics has grown exponentially in the last decades. Most of the plastics used are derived from natural resources such as non-renewable fossil oil sources. It is generally thought in the industry that in order to fulfill the future increasing need for plastics, the plastics must be recycled, particularly recycled plastic materials or fibers for use in disposable products. Using recycled materials is also thought to be better for the environment and decreases the waste of natural resources that are used for disposable products.

The largest plastics market (and therefore the largest source for recycled material) is packaging, which accounts for about 40% of the total plastics production. It would be favorable for the plastics industry to develop methods for recycling surplus or unused material, which would otherwise go to waste by being burned or placed in a landfill. However, the use of recycled materials and fibers has drawbacks. It is generally recognized in the art that recycled materials and fibers often result in products that have physical properties which are generally less acceptable than products made from virgin materials or fibers. As a result, the amount of recycled materials or fibers used in products is often limited due to the lost in physical properties of products prepared from recycled materials or fibers.

The use of recycled materials or fibers is becoming a greater part of some industries. For example, EP3040199B1 discloses self-recyclable barrier packaging and describes an all-PO multilayer structure that facilitates the recycling of post-consumer waste for barrier packaging applications. U.S. Pat. No. 9,447,269 B2 discloses a modified flexible EVOH for high performance films wherein the film shows good flexibility and barrier performance by incorporating a polymer modifier. A presentation given at an AMI conference in 2019 entitled "Efficient and Sustainable Solutions for Synthetic Grass Yarns" STC Spinnzwirn, describes a bicomponent artificial turf yarn where the core enables options for recycling of used grass carpets or production waste. A publication entitled "Insights into the Complex Issue of Recycling Plastic Packaging Waste"; Wageningen UR food and biobased research, (2013), describes a scientific approach to calculate the cost/efficiency and environmental impact of plastic packaging waste. Another paper entitled "Mechanical Recycling of Plastic Packaging Waste", PhD Thesis (2014) by Benny Luijsterburg, describes similar work to the publication above, and describes the complex problem of recycling packaging waste. Still another publication, entitled "Polyethylene Useful for Producing Film and Molded Articles in a Process which Uses Solid State Stretching", Total American Services Inc., describes a method for orienting a cast article using a specific resin with different properties such as melt index (MI) and density.

None of the above prior art references disclose the use of a post-consumer recycled (PCR) material originating from packaging applications or the incorporation of PCR material into a resin such as a polyethylene resin. The above prior art references also do not disclose the orientation characteristics and properties of the resulting material of combining a PCR material and a resin. The above prior art references are also silent about the use of PCR material for artificial turf applications. The properties of artificial turf yarns can significantly differ when made from various different known resin products.

Current artificial turf pitches comprise polyethylene fibers, called yarn, that mimic the real grass blades. The performance of the whole turf system is highly determined by the yarn used to prepare the turf system. The general method of making artificial turf includes the steps of tufting polyethylene fibers into a primary backing and coating the primary backing with a secondary backing to keep yarn distributed and fixed. A granular infill is spread over the pitch to maintain yarn in upright position. And typically, a soft pad layer is added to the secondary backing to provide shock absorption.

Traditionally, synthetic turf is widely used in high-demanding sports applications which require high durability and must meet other stringent requirements to be certified by sports or governmental bodies. The known PCR materials, for example a PCR material sourced from packaging waste streams, cannot be processed into a monofilament having the required properties useful for making a synthetic or artificial turf yarn which, in turn, can be used for preparing an artificial turf surface product with the high-performance attributes necessary for use in sports applications.

SUMMARY

The present invention is directed to a composition including a PCR material that can be readily converted into a filament article, for example a mono- and bi-component monofilament yarn, as well as into a mono- and multi-layer fibrillated tape yarn.

In one general embodiment, the filament composition of the present invention includes a combination of: (a) a PCR material and (b) a "booster" additive. In a preferred embodiment, the PCR material includes a mixture of (ai) a linear low-density polyethylene (LLDPE) resin and (aii) a low-density polyethylene (LDPE) resin materials originating from packaging waste streams of flexible packaging production applications; and the booster additive includes a virgin LLDPE resin. The virgin LLDPE resin is referred to as a "booster" additive because the additive advantageously boosts the performance of PCR material to make the PCR material suitable for use in artificial turf yarns, wherein the yarns have a combination of processability and mechanical performance for the artificial grass application.

In another embodiment, the present invention is directed to a composition for forming a filament, the filament composition including a blend of: (a) from 1 wt % to 40 wt % of a PCR material having a density of from 0.910 g/cm3 to 0.940 g/cm3 and a melt index of from 1.0 g/10 min to 5.0 g/10 min; wherein the PCR material consists essentially of from 70 wt % to 95 wt % of a LLDPE and from 5 wt % to 30 wt % of a LDPE; and (b) from 60 wt % to 99 wt % of a booster comprising a virgin LLDPE; wherein the viscosity in units of Pa·s of the booster is no less than 0.5 times the viscosity of the PCR material and no more than 2.0 times the viscosity of the PCR material in the range of from 50 rad/s shear rate to 220 rad/s shear rate.

In another embodiment, the present invention includes a filament made from the above filament composition.

In still another embodiment, the present invention is directed to an artificial turf article made from the above filament.

In other embodiments, the present invention includes processes for making the above filament composition, the above filament, and the above artificial turf article.

DETAILED DESCRIPTION

Figure 1:
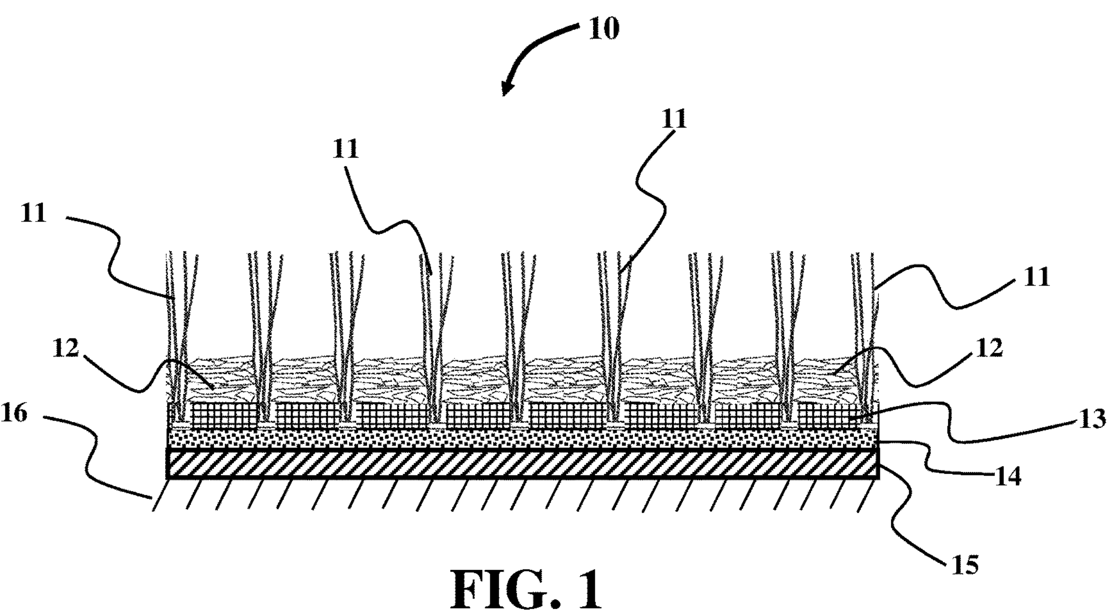
FIG. 1 is a side view of an artificial turf article showing the various layers of the article cross-sectioned in part.

As used throughout this specification, the abbreviations given below have the following meanings, unless the context clearly indicates otherwise: "=" means "equal to"; "<" means "less than"; ">" means "greater than"; g=gram(s); mg=milligram(s); kg=kilograms; kg/hr=kilograms per hour; %=percent; kg/m3=kilograms per cubic meter; g/10 min=grams per 10 minutes; g/min=grams per minute; mbar/min=millibars per minute; mL=milliliter(s); g/L=grams per liter; Mw=molecular weight; m=meter(s); μm=micron(s); mm=millimeter(s); cm=centimeter(s); min=minute(s); m/min=meter(s) per minute; mm/min=millimeter(s) per minute; s=second(s); hr=hour(s); rad/s=radian per second; ° C.=degree(s) Celsius; Pa·s=pascals-seconds; dtex or Decitex=grams per 10,000 meters; cN=centinewton(s); cN/dtex=centinewtons per detex; mm2=millimeter squared; vol %=volume percent; and wt %=weight percent.

All percentages stated herein are weight percentages (wt %), unless otherwise indicated.

Temperatures are in degrees Celsius (° C.), and "ambient temperature" means between 20° C. and 25° C., unless specified otherwise.

A "post-consumer recycled (PCR) material" is defined by ISO 14021:2016 as a material generated by households or by commercial, industrial and institutional facilities in such facilities' role as end-users of the product which can no longer be used for the product's intended purpose. PCR materials includes returns of material from the distribution chain. Some of the property characteristics of a PCR material typically include, for example, a melt index in the range of from 1 g/10 min to 5 g/10 min; a density of from 0.910 g/cm3 to 0.940 g/cm3. The PCR material is often a blend of, for example, two or more compounds such as the combination of a linear low-density polyethylene (LLDPE) and a low density polyethylene (LDPE); a polyamide (PA) and ethylene vinyl alcohol (EVOH); and a high density polyethylene (HDPE) and a polypropylene (PP).

In one broad embodiment of the present invention, a blend composition or composition useful for preparing an artificial turf filament includes, for example, a blend of: (a) a post-consumer recycled material; and (b) a virgin linear low density polyethylene.

Exemplary of the PCR material useful in the filament blend composition of the present invention include for example two or more of the following compounds: LLDPE, LDPE, high density polyethylene (HDPE), polypropylene (PP), PA, EVOH, polyethylene terephthalate (PET) and mixtures thereof. In a preferred embodiment, the PCR material may include, for example, LLDPE, LDPE and mixtures thereof.

In general, the PCR material is sourced from packaging waste, such as material generated by households or by commercial, industrial and institutional facilities in their role as end-users of the product. The PCR material has a melt index in the range of from 1 g/10 min to 5 g/10 min in one general embodiment; and from 1.5 g/10 min to 3 g/10 min in another embodiment. The density of the PCR material is generally from 0.910 g/cm3 to 0.940 g/cm3 in one embodiment; and from 0.915 g/cm3 to 0.925 g/cm3 in another embodiment.

The PCR material, component (a), used in the blend filament composition, can be present in an amount generally <40 wt % PCR material from packaging waste in one embodiment; from 1 wt % to 35 wt % in another embodiment; from 5 wt % to 30 wt % in still another embodiment; and from 10 wt % to 20 wt % in yet another embodiment. The PCR material has the melt index range and the density range described above. If the PCR material is used >40 wt %, the resultant yarn is not processable due to extrusion instability and filament breakages during stretching.

The PCR material, component (a), is itself a blend of (ai) at least one LLDPE and (aii) at least one LDPE. The amount of LLDPE, component (ai), used to make the PCR, is generally from 20 wt % to 99 wt % in one embodiment; from 40 wt % to 95 wt % in another embodiment; and from 60 wt % to 90 wt % in still another embodiment. If the quantity of LLDPE is <20 wt %, the mechanical properties of the filament may be compromised. If the quantity of LLDPE is >99 wt %, the processability of the filament may be compromised.

The amount of LDPE, component (aii), used to make the PCR, is generally from 1 wt % to 80 wt % in one embodiment; from 5 wt % to 60 wt % in another embodiment; and from 10 wt % to 40 wt % in still another embodiment. If the quantity of LDPE is >80 wt %, the mechanical properties of the filament may be compromised. If the quantity of LDPE is <1 wt %, the processability of the filament may be compromised. In one preferred embodiment, the PCR includes a blend of at least 75 wt % LLDPE, component (ai), and <25 wt % LDPE, component (aii).

An objective of the present invention is to provide a "booster" component (which is component (b), the virgin linear low density polyethylene) to the PCR material (component (a)) to increase the performance and the processability of PCR material. In a general embodiment, the booster, component (b), used in the present invention is a virgin linear low-density polyethylene (LLDPE) with a medium density range. For example, in order to ensure homogeneity between the virgin linear low density and PCR, the viscosity, in pascal-seconds, of the components is measured by the procedures described in ASTM D4440-84 and ASTM D4703. The process of ASTM D4703 per compression mold plaques, is used as a first step for measuring the rheology of the mixture; and then, the process of ASTM D4440-84 is used for rheology measurements. The viscosity of the virgin linear low density polyethylene is no less than 0.5 times the viscosity of the post-consumer recycled material and no more than 2.0 times the viscosity of the post-consumer recycled material in the range of from 50 rad/s shear rate to 220 rad/s shear rate.

The virgin linear low density polyethylene, component (b), which acts as a booster for processability used in the blend composition, can be present in an amount generally >60 wt % in one embodiment; from 65 wt % to 99 wt % in another embodiment; and from about 70 wt % to about 95 wt % in still another embodiment. If the concentration of virgin polymer is <60 wt %, the processability and mechanical performance of the filament may be compromised. If the concentration of virgin polymer is >99 wt %, the opportunities to incorporate sufficient post-consumer waste into the composition are minimized.

In another embodiment, the blend composition of the present invention can include a wide variety of other optional additives. The additives in combination with the composition of the present invention may be formulated to enable performance of specific functions while maintaining the excellent benefits/properties of the blend composition. For example, the following additives may be blended with the blend composition to form the filament composition of the present invention including: antioxidants, pigments, colorants, UV stabilizers, UV absorbers, curing agents, cross linking co-agents, boosters and retardants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators, and the like; and mixtures thereof.

In one embodiment, for example, a colorant can be used in the filament composition, such as SICOLEN™ green 85-125345 (available from BASF). The colorant may be added in an amount of from 0 wt % to <10 wt % in one embodiment, from 0.01 wt % to <8 wt. % in another embodiment, from 0.1 wt % to <6 wt. % in still another embodiment, and from 1 wt % to <4 wt. % in yet another embodiment.

In another embodiment, for example, a processing aid can be used in the filament composition, such as ARX-741 (available from Argus). The processing aid may be added in an amount of from 0 wt % to <2 wt % in one embodiment, from 0.01 wt % to <1.5 wt % in another embodiment, and from 0.1 wt % to <1 wt % in still another embodiment.

Other optional additives, when used in the blend filament composition, can be used in amounts ranging from 0 wt % to 10 wt % in one embodiment, from 0.001 wt. % to 10 wt. % in another embodiment, from 0.5 wt % to 10 wt % in still another embodiment, and from 5 wt % to 10 wt % in yet another embodiment, based on the weight of the composition.

In one broad embodiment of the present invention, a process for making the blend composition includes, for example, mixing components (a) and (b) described above; and any desired optional component (c) as described above. Any conventional mixing apparatus and process can be used to mix the components (a) and (b) together. For example, a dry blend can be prepared by compounding the two components together. In another embodiment, the two components can be formed into pellet form by pelletizing the mixed components using, for example, known processes in the art such as the process described in PCT Patent Application Publication No. WO1993000400A1 which discloses polyethylene blends for molding.

One of the advantageous/beneficial properties exhibited by the blend composition produced according to the above-described process, includes, for example, the composition of the present invention can has an increase in processability. By "increase in processability", it is meant that the composition can be processed through the production of a filament without a stop in the process due to filter obstruction or other failure in the process. The composition also advantageously provides a filament with a mechanical performance (tenacity, shrinkage and elongation) that remains constant in all samples with any blend composition between PCR and LDPE. For example, the mechanical performance of the filament is evaluated through tenacity and ultimate elongation which is measured using a single filament of 250 mm in length and measured in a Zwick tensile dynamometer at 250 mm/min until the fiber breaks. Tenacity is defined as the tensile force at break divided by the linear weight and expressed in cN/dtex. Ultimate elongation is the strain at fiber break, expressed in percentage of deformation. The shrinkage property of the filament is measured by cutting one meter of yarn and immersing the yarn into a hot oil bath at 90° C. for 20 s. The yarn is removed from the bath, manually dried, and re-measured for length. Thermal shrinkage is expressed as the percentage of length reduction before and after the immersion.

There is no impact to the mechanical performance of a filament made from the compositions including PCR material, the mechanical performance is the same as virgin LLDPE in all the blending compositions. The difference between blend compositions is indicated by the processability of the resultant filament made from the compositions. For example, with compositions of PCR>60%, the yarn is not processable due to filter obstruction. Therefore, with regard to the increase of pressure in the extruder, as the increase of pressure is lowered in the extruder, the higher is the processability of the filament.

A composition of a pure PCR material cannot be extruded due to high increase of pressure and breakage of the film during the process. The addition of a booster such as virgin LLDPE helps to avoid the breakage of the filaments and films by reducing the pressure increase in the extruder. Blends which contain <40 wt % of PCR have an increase of pressure over time which is acceptable for continuous processing, and using an amount of PCR at >40 wt % the pressure increase is considered not acceptable.

The composition of the present invention can be converted into mono- and/or bi-component monofilament yarns, as well as into mono- and/or multi-layer fibrillated tape yarns.

In one broad embodiment of the present invention, the blend composition described above is used for making a filament per se. The filament make-up includes, for example, the following components (a) and (b) described above. For example, if additives are used in the amount of 9 wt % of the composition, the remaining 91 wt % of the composition is the blend between PCR and virgin LLDPE (with the ranges of composition defined).

In one broad embodiment of the present invention, a process for making the filament includes, for example, (A) making the blend composition by mixing components (a) and (b) as described above; and then (B) extruding the mixture from step (A) through an extruder to form a filament.

Suitable conventional filament extruders, particularly artificial turf filament extruders, may be equipped with a single general-purpose screw and a melt pump ("gear pump" or "melt pump") to precisely control the consistency of polymer volume flow into a die. Artificial turf filament dies may have multiple single holes for the individual filaments distributed over a circular or rectangular spin plate. The shape of the holes corresponds to the desired filament cross-section profile, including for example, a rectangular shaped profile, a dog-bone shaped profile, a v-shaped profile, and a Mexican hat shaped profile. A standard spin plate has 50 die holes to 160 die holes of specific dimensions. Lines can have output rates from 50 kg/hr to 350 kg/hr in one general embodiment.

The artificial turf filaments may be extruded into a water bath with a die-to-water bath distance of from 16 mm to 40 mm in one general embodiment. Coated guiding bars in the water redirect the filaments towards the first takeoff set of rollers. The linear speed of this first takeoff set of rollers may vary generally from 15 m/min to 70 m/min. The first takeoff set of rollers can be heated and used to preheat the filaments after the water bath and before entering the stretching oven. The stretching oven may be a heated air or water bath oven. The filaments may be stretched in the stretching oven to a predetermined stretched ratio. In some embodiments, the stretch ratio is at least 3.5. In other embodiments, the stretch ratio is at least 4.5, at least 4.8, at least 5.0, at least 5.2, or at least 5.5. The stretching ratio is the ratio between the speed of the second takeoff set of rollers after the stretching oven and the speed of the first takeoff set of rollers before the stretching oven. The second takeoff set of rollers may be run at a different (higher or lower) speed than the first set of rollers.

After the filaments are passed over the second takeoff set of rollers, the filaments are then drawn through a set of three annealing ovens. The three annealing ovens may be either a hot air oven with co- or countercurrent hot air flow, which can be operated from 50° C. to 150° C. or a hot water-oven, wherein the filaments are oriented at temperatures from 50° C. to 98° C. At the exit of the first annealing oven, the filaments are passed onto a third set of rollers that may be run at a different (higher or lower) speed than the second set of rollers. The linear velocity ratio of the third set of rollers located after the oven to the second set of rollers located in front of the oven may be referred to as either a stretching or relaxation ratio. At the exit of the second annealing oven, the filaments are passed onto a fourth set of rollers that may be run at a different (higher or lower) speed than the third set of rollers. At the exit of the third annealing oven, the filaments are passed onto a fifth set of rollers that may be run at a different (higher or lower) speed than the fourth set of rollers.

The artificial turf filament may optionally undergo further post-extrusion processing (e.g., annealing, cutting, and the like).

The present artificial turf filaments may be defined by various properties. For example, in some embodiments herein, the artificial turf filaments may exhibit a shrink of <8.0%, a tenacity of >0.8 cN/dtex and an elongation of >60%. All individual values and subranges of <8.0% are included and disclosed herein.

Some of the advantageous/beneficial properties exhibited by the filament (or yarn) produced according to the above-described process, can include, for example, the yarn is processable when using the present invention. The processability is limited due to pressure increase in the extruders. The present invention allows a possibility to maintain the pressure inside the extruder close to constant and to minimize the pressure increase inside the extruder. If the pressure increase become too high, the yarn cannot be produced in a stationary way. The mechanical properties remain constant in all the blends used in the present invention (for example, there is no impact of the recycled material incorporated into the structure).

For example, the pressure increase is measured by measuring the slope of the pressure inside the extruder. In one general embodiment, the pressure increase inside the extruder is kept at <700 mbar/min.

The mechanical properties of filament, for example, tenacity is determined using a Zwick tensile tester, operating on a 250 mm length of the monofilament, and using an extension speed of 250 mm/min until the filament breaks. The tenacity (in cN/dtex) is the tensile stress (in cN) at break divided by the linear weight (in dtex). The tenacity of the filament is >0.6 cN/dtex in one general embodiment.

The mechanical property of elongation for the filament, for example, tenacity is also determined using a Zwick tensile tester wherein elongation is the strain at break. Generally, the elongation of the filament is >60% in one embodiment.

The advantageous properties of tenacity and elongation of the filament of the present invention is important because such properties allow the use of PCR in yarn and provides the PCR in yarn with extrudability performance. In addition, the advantageous properties of the filament is important because the benefit is on processability of the filament and no mechanical properties of the filament are compromised.

In one broad embodiment of the present invention, the filament described above is used for making various products such as yarn, film, fabric, carpet, and the like. In a preferred embodiment, the filament is used to make, for example, an artificial turf product (also referred to as imitation grass, artificial grass, or artificial carpet).

The artificial turf produced using the yarn (filaments) of the present invention includes, for example, the following components: yarn, infill, primary backing, secondary backing, shock pad and optionally a drainage system. The yarn can be a single layer or a multilayer structure. For example, with reference to FIG. 1, there is shown an assembly of a multi-layer artificial turf article generally indicated by reference numeral 10, including, for example, a yarn turf layer 11, a granular infill material 12, a primary backing layer 13, a secondary backing layer 14, and a planar shockpad member 15. As shown in FIG. 1, the layers 11, 13, 14 and 15 are attached to each other and the granular infill material 12 is spread on top of the yarn turf layer 11 to make up the multi-layer artificial turf article. The artificial turf 10 can be disposed on the ground surface 16 or other desired surface.

The artificial turf 10 produced using the yarn (filaments) 11 of the present invention is produced by tufting the yarn 11 into a primary backing layer 13.

The artificial turf 10 may optionally comprise an infill material 12. Suitable infill materials include, but are not limited to, mixtures of granulated rubber particles like SBR (styrene butadiene rubber) recycled from car tires, EPDM (ethylene-propylene-diene monomer), other vulcanized rubbers or rubber recycled from belts, thermoplastic elastomers (TPEs), thermoplastic vulcanizates (TPVs) and mixtures thereof.

The primary backing 13 can include, but is not limited to, woven, knitted, or non-woven fibrous webs or fabrics made of one or more natural or synthetic fibers or yarns, such as polypropylene, polyethylene, polyamides, polyesters, rayon, and mixtures thereof.

The secondary backing 14 may include polyurethane (including, for example, polyurethane supplied under the name ENFORCER™ or ENHANCER™ available from The Dow Chemical Company) or latex-based materials, such as, styrene-butadiene latex, or acrylates; and mixtures thereof.

The artificial turf 10 may optionally include a shock absorption layer 15 underneath the secondary backing 14 of the artificial turf 10. The shock absorption layer 15 can be made from polyurethane, PVC foam plastic or polyurethane foam plastic, a rubber, a closed-cell crosslinked polyethylene foam, a polyurethane underpad having voids, elastomer foams of polyvinyl chloride, polyethylene, polyurethane, polypropylene, and mixtures thereof. Nonlimiting examples of a shock absorption layer include, for example, DOW® ENFORCER™ Sport Polyurethane Systems, and DOW® ENHANCER™ Sport Polyurethane Systems.

The artificial turf 10 may optionally include a drainage system (not shown in FIG. 1). The drainage system allows water to be removed from the artificial turf 10 and prevents the artificial turf 10 from becoming saturated with water. Nonlimiting examples of drainage systems include stone-based drainage systems, EXCELDRAIN™ Sheet 100, EXCELDRAIN™ Sheet 200, AND EXCELDRAIN™ EX-T STRIP (available from American Wick Drain Corp., Monroe, N.C.).

In one broad embodiment of the present invention, a process for making the artificial turf product 10 includes, for example, a process as described in WO2019133789. In general, the process includes the steps of (A) providing: (I) an artificial turf carpet or carpet of filaments 11; (II) at least one primary backing 13; and (III) at least one secondary backing 14; and (B) combining the above components by integrally attaching the primary backing layer 13 to the turf carpet 11 and the secondary backing layer 14 to the primary layer 13. Then, (C) optionally adding a shockpad layer 15 to the above assembly. In another embodiment, the artificial turf system or assembly of the present invention can further optionally include (IV) a granular infill material 12 and the infill material 12 can be spread over the artificial turn yarn carpet 11. In still another embodiment, a drainage system can optionally be included in the artificial turf below the shockpad 15.

The advantageous properties of the artificial turf product are based on the benefits of the filament (yarn) described above since the PCR material is incorporated into the filament yarn; and in turn, the yarn is incorporated into the turf product or turf system as described above.

The artificial turf product produced according to the above-described process, has all of the required properties for use in fields such as sports fields and advantageously can withstand the rigors of a sport such as football.

As aforementioned, the filament of the present invention is used, for example, in providing a yarn of a plurality of filaments. The yarn, in turn, is used to make an artificial turf product. And, the turf product, in turn, can be used to cover surfaces to form a field for playing sports such as golf, football, soccer, baseball and the like.

Other applications wherein the filament or the yarn of the present invention can be used in the following applications, for example, monofilament yarns, fibrillated tape yarns, thatch yarn or other yarns, landscaping turf, leisure turf, do-it-yourself turf, contact sports, and non-contact sports applications.

EXAMPLES

The following examples are presented to further illustrate the present invention in detail but are not to be construed as limiting the scope of the claims. Unless otherwise stated all parts and percentages are by weight.

Various ingredients, components, additives, or raw materials used in the Inventive Examples (Inv. Ex.) and the Comparative Examples (Comp. Ex.) are explained hereinbelow as follows:

The raw materials used in the present invention include: (1) a PCR with a density of 0.922 g/cm3 and a melt flow index of 2 g/min; (2) a Booster 1 which is a hexene-based Ziegler Natta catalyst LLDPE with a density of 0.918 g/cm3 and a melt index of 2.3 g/10 min; and (3) a Booster 2 which is an octene-based Ziegler Natta catalyst LLDPE with a density of 0.917 g/cm3 and melt index of 2.3 g/10 min. The color masterbatch used is Green 1229 and the processing aid is ARX-741.

Examples 1-5 and Comparative Example A

Several sample filament compositions were prepared and tested as discussed herein below. Post-consumer recycling material were boosted through the addition of a booster (e.g. Booster 1 and Booster 2 described above) such as virgin LLDPE.

The following Table I summarizes the filament composition of the samples used in Inv. Ex. 1-3 and Comp. Ex. A. The samples in Table I focus on mono-component samples.

TABLE I

| Mono-Component Samples | | | | | |
|---|---|---|---|---|---|
| Example No. | PCR (wt %) | Booster 1 (wt %) | Booster 2 (wt %) | Color masterbatch (wt %) | Processing aid (wt %) |
| Comp. Ex. A | 91 | — | — | 8 | 1 |
| Inv. Ex. 1 | 20 | 71 | — | 8 | 1 |
| Inv. Ex. 2 | 30 | — | 61 | 8 | 1 |
| Inv. Ex. 3 | 20 | — | 71 | 8 | 1 |

The following Table II summarizes the filament composition of the samples used in the Inv. Ex. 4 and 5. The samples in Table II focus on bi-component samples.

TABLE II

| Bi-Component Samples | | | | | | | | |
|---|---|---|---|---|---|---|---|---|
| | Additives | | | | | | | |
| | Color | Processing | Core [50%] | | | Sheath [50%] | | |
| Example No. | Masterbatch (wt %) | Aid (wt %) | PCR (wt %) | Booster 1 (wt %) | Booster 2 (wt %) | PCR (wt %) | Booster 1 (wt %) | Booster 2 (wt %) |
| Inv. Ex. 4 | 8 | 1 | 35 | 56 | — | — | 91 | — |
| Inv. Ex. 5 | 8 | 1 | 35 | — | 56 | — | — | 91 |

In the above Tables I and II, the overall PCR composition is the same in Inv. Ex. 1 and Inv. Ex. 4 as well as Inv. Ex. 5 with Inv. Ex. 3.

Test Methods

A conventional monofilament machine was used to prepare filaments from the filament compositions for testing. In all of the Examples, 8 wt % of a color masterbatch (Green 1229) and 1 wt % of a processing aid (ARX-741) were used in the filament compositions.

The Inventive Examples and Comparative Examples were run at 2,000 dtex. The stretching ratio and annealing remained constant for all the examples, which was 5.2 and 20%, respectively.

The extrusion conditions are summarized in Table III as follows:

TABLE III

| Processing Conditions for Yarn Processability<br>Processing Conditions | |
|---|---|
| Line speed, m/min | 120 |
| Extrusion temperature, ° C. | 220 |
| Godet temperature, ° C. | 235 |
| Oven temperature, ° C. | 120 |
| Stretching ratio | 5.2 |
| Annealing, % | 20 |

All filaments or yarns were extruded with a diamond shape. The mechanical properties of the yarn including tenacity, ultimate elongation and shrinkage were measured in a laboratory.

Tenacity and Ultimate Elongation

A single filament of 250 mm length is measured in a Zwick tensile dynamometer at 250 mm/min until the fiber (filament) breaks. Tenacity of a filament is defined as the tensile force at break divided by the linear weight; and tenacity is expressed in cN/dtex units.

Ultimate elongation of the filament is the strain at fiber break, expressed in percentage of deformation.

Shrinkage

One meter of yarn is cut and immersed into a hot oil bath at 90° C. for 20 s. Yarn is removed from the bath, manually dried and re-measured for length. Thermal shrinkage is expressed as the percentage of length reduction before and after immersion of the yarn in the hot oil bath.

The pressure of the extruder was established as a criterion for processability. The PCR caused filter obturation which lead to a linear increase of the pressure in the extruders, and therefore the pressure increase per minute is reported as the property of processability.

Results of Filament Testing

Table IV describes the pressure increase in the extruder when running the Inventive Examples and the Comparative Examples.

TABLE IV

Pressure Increase in Extruder

| | Example No.: | | | | | |
|---|---|---|---|---|---|---|
| | Comp. Ex B | Inv. Ex. 6 | Inv. Ex. 7 | Inv. Ex. 8 | Inv. Ex. 9 | Inv. Ex. 10 |
| Filament composition used: | Comp. Ex. A | Inv. Ex. 1 | Inv. Ex. 2 | Inv. Ex. 3 | Inv. Ex. 4 | Inv. Ex. 5 |

TABLE IV-continued

Pressure Increase in Extruder

| | Example No.: | | | | | |
|---|---|---|---|---|---|---|
| | Comp. Ex B | Inv. Ex. 6 | Inv. Ex. 7 | Inv. Ex. 8 | Inv. Ex. 9 | Inv. Ex. 10 |
| Pressure increase (mbar/min): | 1,400 | 500 | 420 | 270 | 700 | 700 |

There are instabilities in the extruder due to PCR insertion, which cause the pressure increase. The pressure increase in the extruder diminishes as the quantity of booster increases. It was not possible to collect a sample of Comp. Ex. A due to the pressure increase and the breakage of the fiber during stretching.

Inv. Ex. 7 and Inv. Ex. 8 exhibited the lowest pressure increase. The pressure increase of Inv. Ex. 6, 9 and 10 were at least half of the Comp. Ex. B.

Figure 2:
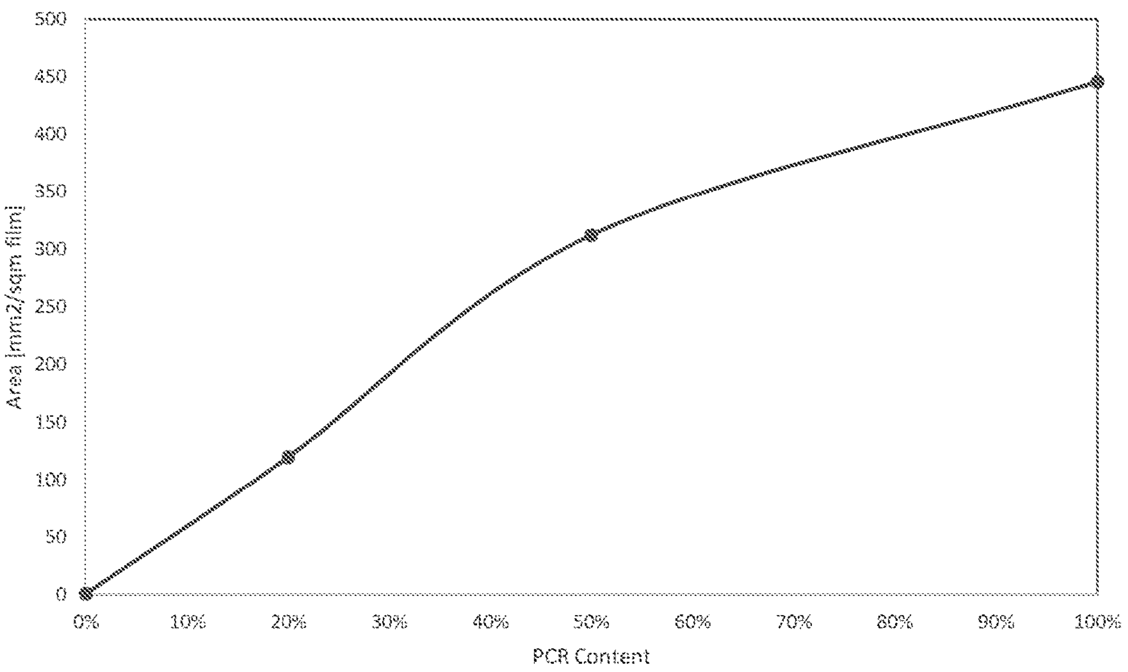
FIG. 2 is a graphical illustration showing an increase of gel area as PCR content increases.

FIG. 2 summarizes the mechanical properties of the Inventive Examples and the Comparative Examples. Even though it was not possible to collect a sample for Comparative Example B due to fiber breakage during stretching, the mechanical properties of the sample were evaluated for comparative purposes.

TABLE V

Mechanical Properties

| | Example No.: | | | | | |
|---|---|---|---|---|---|---|
| | Comp. Ex. B | Inv. Ex. 6 | Inv. Ex. 7 | Inv. Ex. 8 | Inv. Ex. 9 | Inv. Ex. 10 |
| Tenacity, cN: | 1.14 | 1.09 | 1.09 | 1.09 | 1.01 | 1.07 |
| Elongation, %: | 64 | 73 | 73 | 75.3 | 60.8 | 77 |
| Shrinkage, %: | 4.9 | 6.6 | 6.3 | 6.7 | 6 | 7 |

As shown by the results in Table V, the addition of a booster does not influence the mechanical properties of the filament sample, as the mechanical properties do not significantly change for all of the Examples described in Table V. It is desirable for the mechanical properties of a filament sample not to change.

Also as shown by the results in Table V, the processability of the filament composition of Comp. Ex. B is improved by adding the booster as indicated in Inv. Ex. 6, Inv. Ex. 7, and Inv. Ex. 8; and the mechanical properties of the filament samples made from the filament compositions are not affected as the amount of booster increases.

Results of Film Testing

Film prototypes were prepared using the same filament (yarn) composition used to prepare the yarn structures. All films were 200 μm and extruded in a cast extrusion line for evaluation. The extrusion conditions are summarized in Table VI as follows:

TABLE VI

| Extrusion Conditions to Form Films | | | | |
|---|---|---|---|---|
| | | Comp. Ex. C | Inv. Ex. 11 | Inv. Ex. 12 |
| | | Filament Composition Used: | | |
| Parameter | Units | Comp. Ex. A | Inv. Ex. 1 | Inv. Ex. 2 |
| Structure: | — | aaa | aaa | aaa |
| Total Output: | kg/hr | 11 | 11 | 11 |
| Total Thickness: | um | 200 | 200 | 200 |
| Take-off speed: | m/min | 4 | 3.9 | 3.9 |
| Die gap: | mm | 0.8 | 0.8 | 0.8 |
| Amps - Ext. A: | A | 2.8 | 2.7 | 2.9 |
| Amps - Ext. C: | A | 4.4 | 4.4 | 4.4 |
| Amps - Ext. D: | A | 2.7 | 2.8 | 2.8 |
| Layer Percentage - Ext. A: | % | 25 | 25 | 25 |
| Layer Percentage - Ext. C: | % | 50 | 50 | 50 |
| Layer Percentage - Ext. D: | % | 25 | 25 | 25 |
| Melt Pressure - Ext. A: | bar | 91 | 92 | 91 |
| Melt Pressure - Ext. C: | bar | 173 | 171 | 172 |
| Melt Pressure - Ext. D: | bar | 101 | 102 | 101 |
| Melt Temperature - Ext. A: | ° C. | 221 | 221 | 230 |
| Melt Temperature - Ext. C: | ° C. | 221 | 222 | 230 |
| Melt Temperature - Ext. D: | ° C. | 223 | 223 | 231 |
| RPM - Ext. A: | rpm | 60 | 60 | 60 |
| RPM - Ext. C: | rpm | 60 | 60 | 60 |
| RPM - Ext. D: | rpm | 60 | 60 | 60 |
| front rolls speed (leitwert): | m/min | N/A* | N/A | N/A |
| stretching ratio: | — | N/A | N/A | N/A |
| stretching temperature: | ° C. | N/A | N/A | N/A |

In Table VI, "N/A" means "not applicable".

Gel Content Test Method

The test to determine the gel count per square meter of film was performed on the film prototypes to quantify the effect of the booster addition. The gel content test is used to determine the gel content online and offline through the optical measurement of gels. The details and test specifications for the films are summarized in Table VII as follows:

TABLE VII

| Test Specifications of Gel Content Test | |
|---|---|
| Machine Used: | OCS Model FT4, Version 2.0 |
| No. of Measurements: | 5 × 400 |
| Camera Frame Size: | 20 mm × 20 mm |
| Gel Sizes, μm (Size of the gels as measured by the test): | 64 |
| | 100 |
| | 200 |
| | 300 |
| | 400 |
| | 500 |
| | 800 |
| | 1,000 |
| | 1,200 |
| | 1,600 |
| Grey Level (0 to 256): | 150 |

Table VIII summarizes the gel count per square meter of film as a function of the gel size.

TABLE VIII

| Gel Count Per Square Meter as a Function of Gel Size | | | | | | | | | | |
|---|---|---|---|---|---|---|---|---|---|---|
| Gel Size, μm: | 64 | 100 | 200 | 300 | 400 | 500 | 800 | 1,000 | 1,200 | 1,600 |
| Comp. Ex. C: | 1240 | 608 | 1569 | 903 | 527 | 310 | 397 | 1 | 0 | 0 |
| Inv. Ex. 11: | 315 | 155 | 411 | 218 | 112 | 69 | 119 | 2 | 1 | 0 |

As can be seen from the results in Table VIII, the addition of a booster in Inv. Ex. 11 diminishes the gel content of the PCR (Comp. Ex. C). The parameter used to define the acceptable gel content in the sample is gel area/square meter of product. The area of the gels has been computed per each sample and only gels that have a size >100 μm are considered for the gel count, as the mesh of the filter is about 120 μm. Table IX herein below and the graph of FIG. 2 describes all of the values that contains the overall increase of gel area depending on the PCR content. The gel area is in mm2 whereas the film is in square meters.

TABLE IX

| Gel Area Per Square Meter ($mm^2$/sqm) as a Function of PCR Content | | | | |
|---|---|---|---|---|
| PCR Content | 0% | 20% | 50% | 100% |
| Area (100 μm) | 0 | 1.21737 | 3.33794 | 4.77522 |
| Area (200 μm) | 0 | 12.9119 | 36.5053 | 49.2916 |
| Area (300 μm) | 0 | 15.4095 | 45.3803 | 63.8293 |
| Area (400 μm) | 0.25133 | 14.0743 | 43.2283 | 66.2248 |
| Area (500 μm) | 0 | 13.5481 | 43.1969 | 60.8684 |
| Area (800 μm) | 0.50265 | 59.8159 | 139.738 | 199.554 |
| Area (1,000 μm) | 0 | 1.5708 | 0.7854 | 0.7854 |
| Area (1,200 μm) | 0 | 1.13097 | 0 | 0 |
| TOTAL | 0.75398224 | 119.6789721 | 312.172208 | 445.328613 |

What is claimed is:

1. A filament comprising:

a composition comprising a blend of (a) from 1 weight percent to 40 weight percent of a post-consumer recycled material having a density of from 0.910 grams per cubic centimeter to 0.940 grams per cubic centimeter and a melt index of from 1.0 gram per 10 minutes to 5.0 grams per 10 minutes; wherein the post-consumer recycled material consists essentially of (ai) from 30 weight percent to 99 weight percent of a post-consumer recycled linear low density polyethylene, (aii) from 1 weight percent to 70 weight percent of a post-consumer recycled low density polyethylene, and (aiii) optionally a material selected from the group consisting of polyamide, ethylene vinyl alcohol, high density polyethylene, polypropylene, polyethylene terephthalate, and combinations thereof; and (b) from 60 weight percent to 99 weight percent of a virgin linear low density polyethylene having a melt index greater than or equal to 2.0 g/10 minutes;

wherein the post-consumer recycled material has a gel content from greater than 1 gel area in millimeters squared per square meter of film to less than 312 gel area in millimeters squared per square meter of film as measured according to the method described in the Gel Content test method herein; wherein the gel area considers gels with a diameter greater than 100 microns.

2. The filament of claim 1, wherein post-consumer recycled material has a melt index of from 1.5 gram per 10 minutes to 3 grams per 10 minutes.

3. The filament of claim 1, wherein post-consumer recycled material has a density of from 0.910 gram per cubic centimeter to 0.930 gram per cubic centimeter.

4. The filament of claim 1, wherein the virgin linear low density polyethylene has a density of from 0.910 gram per cubic centimeter to 0.940 gram per cubic centimeter.

5. The filament of claim 1, wherein the filament has a core/sheath cross-sectional profile; and wherein the core comprises the blend and the sheath comprises a second virgin linear low density polyethylene.

6. The filament of claim 1 where the virgin linear low density polyethylene comprises a first virgin linear low density polyethylene having a melt index greater than or equal to 2.0 g/10 min; and a second virgin linear low density polyethylene having a melt index greater than or equal to 2.0 g/10 min.

7. The filament of claim 6 wherein the first virgin linear low density polyethylene is an ethylene/hexene copolymer and the second virgin linear low density polyethylene is an ethylene/octene copolymer.

8. The filament of claim 1 wherein the filament has a shrink less than 8%.

9. The filament of claim 1 wherein the filament has a tenacity greater than 0.8 cN/dtex.

10. The filament of claim 1 wherein the filament has an elongation greater than 60%.

11. The filament of claim 1 wherein the filament is a monocomponent filament.

12. The filament of claim 1 wherein the post-consumer recycled material is a post-consumer recycled material as defined by International Standards Organization (ISO) 14021:2016.

13. The filament of claim 12 wherein the viscosity in pascal-seconds of the virgin linear low density polyethylene is no less than 0.5 times the viscosity of the post-consumer recycled material and no more than 2.0 times the viscosity of the post-consumer recycled material in the range of from 50 radian per second shear rate to 220 radian per second shear rate as measured in accordance with ASTM D4703 and ASTM D4440-84.

14. The filament of claim 1 wherein the post-consumer recycled material has a gel content from greater than 119 gel area in millimeters squared per square meter of film to less than 312 gel area in millimeters squared per square meter of film.

15. The filament of claim 7 wherein component (aiii) is present.

16. The filament of claim 1 comprising (a) from 5 wt % to 35 wt % of the post-consumer recycled material; and (b) from 95 wt % to 70 wt % of the virgin linear low density polyethylene.

17. The filament of claim 1 wherein the filament has a shrinkage less than 8.0%;

a tenacity greater than 0.8 cN/dtex; and an elongation greater than 60%.

18. The filament of claim 17, wherein the filament has a stretch ratio of at least 3.5.

* * * * *